L. A. LAWHON.
CORN PLANTER.
APPLICATION FILED AUG. 29, 1910.

990,148.

Patented Apr. 18, 1911.
2 SHEETS—SHEET 1.

Witnesses
W. N. Woodson
Jennie M. Fallin

Inventor
L. A. Lawhon

By Van Macey, Attorneys.

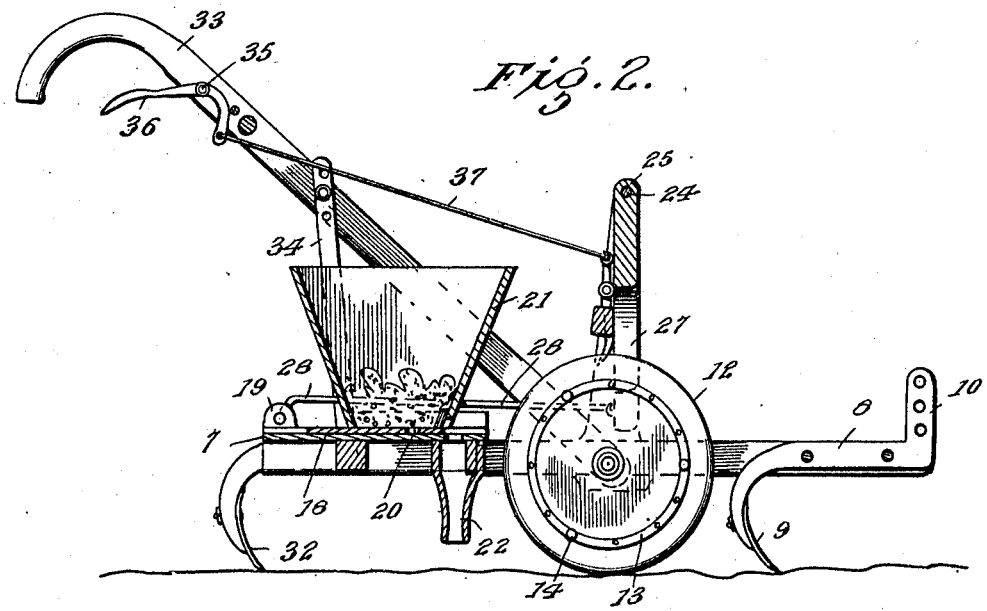
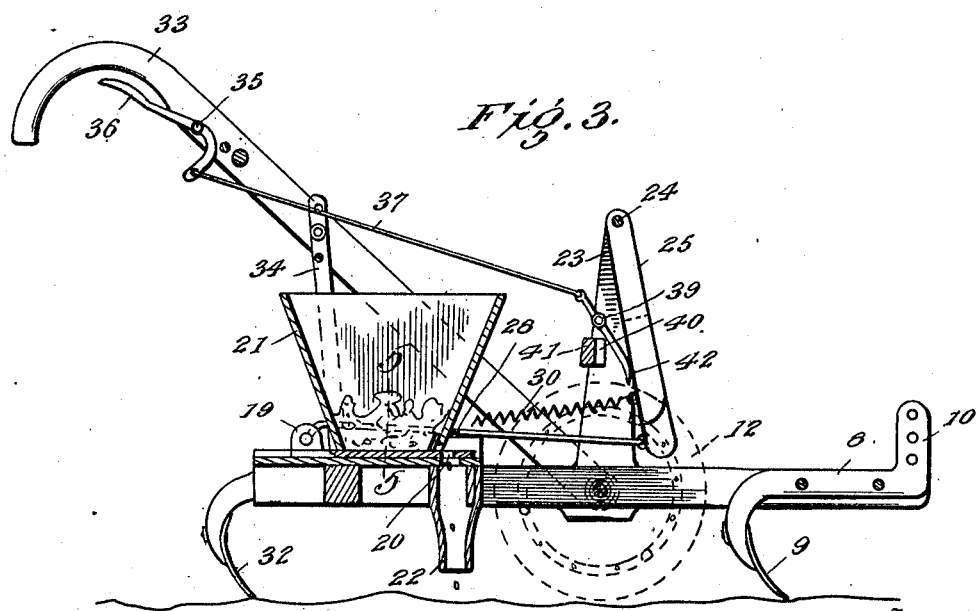

UNITED STATES PATENT OFFICE.

LEONARD A. LAWHON, OF CARTHAGE, NORTH CAROLINA.

CORN-PLANTER.

990,148.

Specification of Letters Patent.

Patented Apr. 18, 1911.

Application filed August 29, 1910. Serial No. 579,445.

*To all whom it may concern:*

Be it known that I, LEONARD A. LAWHON, citizen of the United States, residing at Carthage, in the county of Moore and State of North Carolina, have invented certain new and useful Improvements in Corn-Planters, of which the following is a specification.

This invention relates to corn planters and has for its object the provision of a planter of simple and durable construction, by means of which corn, cotton, and other grain or seed may be readily planted with very little exertion on the part of the operator.

A further object is to provide a corn planter including a supporting frame having a wheel or disk mounted for rotation thereon and provided with spaced laterally extending pins adapted to actuate the seed-slide and drop the grain at predetermined intervals as the planter travels over a field or other inclosure.

A further object is to provide a corn planter having a swinging frame pivotally mounted thereon and provided with spaced arms, one of which is operatively connected with the seed-slide and the other extended into the path of movement of the pins on the wheel or disk thereby to reciprocate the seed-slide.

A further object is to provide means for moving the arms of the swinging frame out of the path of the pins so as to prevent the discharge of grain or seed from the hopper when making a turn, or when the planter is being transported from place to place.

A still further object of the invention is generally to improve this class of devices so as to increase their utility, durability and efficiency.

For a full understanding of the invention reference is to be had to the following description and accompanying drawing, in which:—

Figure 1:
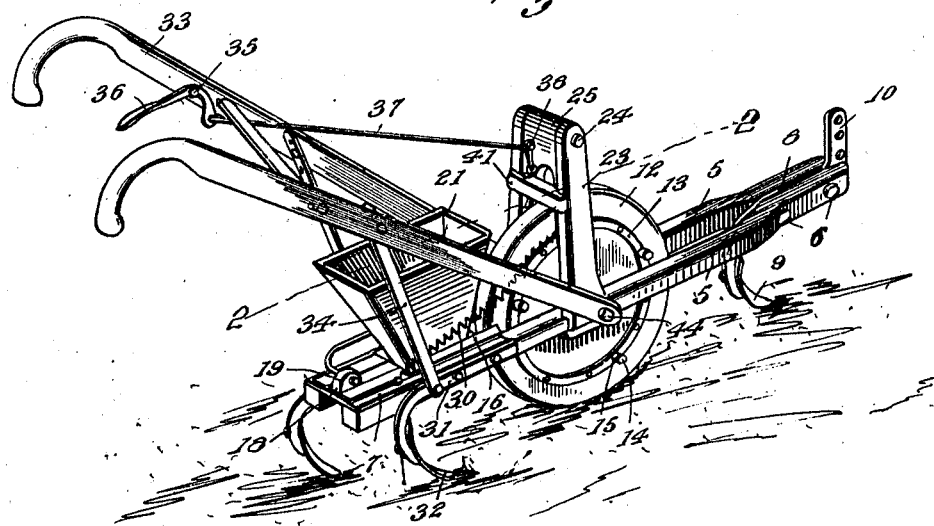
Figures 4, 5:
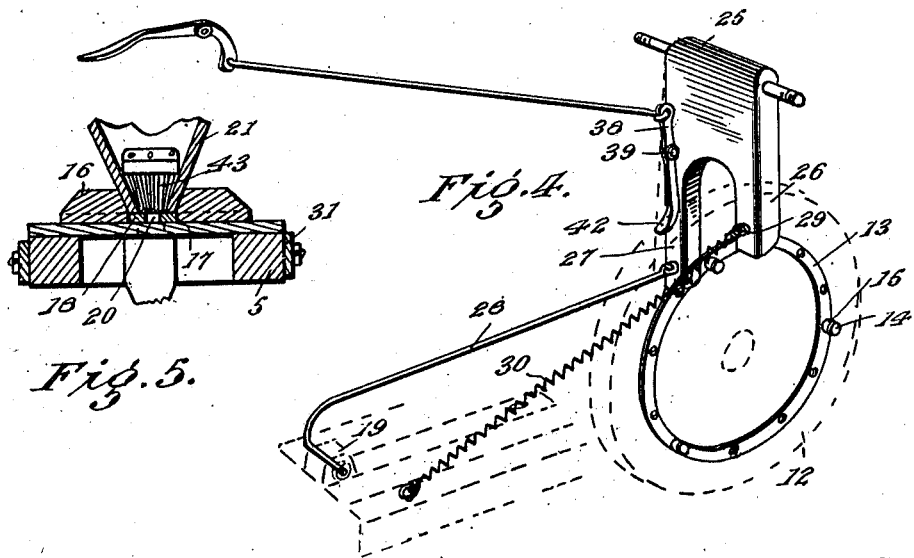

Figure 1 is a perspective view of a corn or other planter constructed in accordance with my invention. Fig. 2 is a vertical sectional view taken on the line 2—2 of Fig. 1. Fig. 3 is a similar view showing the position of the swinging frame when the seed-slide is actuated to drop the grain. Fig. 4 is a detail perspective view of the wheel or disk and swinging frame detached, showing the connection between one arm of said frame and the seed-slide. Fig. 5 is a transverse sectional view taken on the line 5—5 of Fig. 3 showing the construction of the hopper and the position of the brush and seed-slide.

Corresponding and like parts are referred to in the following description and indicated in all the views of the accompanying drawings by the same reference characters.

The improved corn planter forming the subject-matter of the present invention comprises a supporting frame including spaced longitudinal side-bars 5 having their forward ends bent inwardly and rigidly united by bolts or similar fastening devices 6, and their rear ends connected by a transverse plate 7. Interposed between the converging ends of the side-bars 6 is a bar 8 having one end thereof bent downwardly to provide a support for a shovel or blade 9 and its other end extended upwardly to form a clevis 10 for attachment to a draft animal.

Mounted for rotation between the side-bars 5 at the rear of the shovel 9 is a wheel or disk 12, preferably solid, as shown, and provided with oppositely disposed reinforcing rings 13 having spaced openings formed therein to permit the passage of bolts or pins 14. The heads of the bolts or pins 14 project laterally from one side of the wheel or disk 12, and interposed between said heads and the adjacent ring 13 are tubular members or sleeves 15 which serve to prevent injury to the pins when the planter is in operation.

Secured to the upper surface of the transverse plate 7 are spaced plates or guides 16 defining an intermediate groove 17 in which is slidably mounted a reciprocating slide 18. One end of the slide 18 is provided with an upstanding ear 19, while the other end thereof is formed with an opening or pocket 20 adapted to receive some of the seed from the hopper 21 and deposits the same in a tube 22 at each reciprocation of the seed-slide. The side walls of the hopper 21 are preferably inclined downwardly and secured to the cleats 16 so as to feed the grain in the direction of the slide 18.

Secured to the side-bars 5 on each side of the wheel 12 are uprights or standards 23 between which is pivotally mounted at 24 a swinging frame 25. The lower end of the frame 25 is bifurcated to embrace the wheel 12 and also to provide spaced arms 26 and 27 of different lengths, as best shown in Fig. 4 of the drawings. Secured to the lower end of the arm 27 is one end of a rod 28, the opposite end of which extends rearwardly and is thence bent inwardly for attachment to the ear 19. Secured to the lower end of the arm 26 is an eye 29 to which is fastened one end of a coil-spring 30, the opposite ends of said coil-spring being anchored in any suitable manner on the transverse plate 7. The lower end of the arm 26 extends into the path of movement of the pins 14 so that as the wheel 12 rotates, the pins 14 will successively engage the arm 26 and move the swinging frame 25 outwardly against the tension of the spring 30, and through the medium of the rod 28 reciprocate the slide 18 so as to deliver the seed to the tube or spout 22, the spring 30 serving to return the swinging frame 25 to its normal position after each tilting movement thereof by engagement with the pins 14.

Secured to the side-bars 5 at the rear of the frame are reinforcing bars 31 to the lower ends of which are secured blades or shovels 32. The blade or shovel 9 serves to form a furrow for the seed, while the blades or shovels 32 throw the earth over the seed to serve to cover the same.

Secured to the rear of the supporting frame are spaced handles 33 to the inner faces of which are fastened in any suitable manner vertically disposed braces 34, said braces being secured to the bars 31, as best shown in Fig. 1 of the drawings. Pivotally mounted at 35 on one of the handles 33 is an operating lever 36 having an angular terminal to which is pivotally connected one end of a rod 37, the opposite end of which is fastened to the upper end of a lever 38 pivotally mounted at 39 on one of the standards 23. The lower end of the lever 38 projects downwardly within a recess 40 formed in a transverse bar 41 secured to the standards, and is deflected laterally to form a curved bearing face 42 adapted to bear against the long arm 27 of the swinging frame for the purpose of moving the arm thereof out of the path of movement of the pins 14 when making a turn, or when transporting the planter from place to place.

By changing the position of the pins 14 the seed may be planted at any desired distance apart.

Thus it will be seen that as the planter is caused to travel over a field or other inclosure, the pins 14 will successively engage and tilt the swinging frame 25 so as to actuate the slide 18 and drop the seed at predetermined intervals, the construction of the device being such that by pulling upwardly on the lever 36 the swinging frame may be moved to inoperative position so as to prevent the discharge of seed when desired.

It will, of course, be understood, that any number of pins may be provided and that the spacing of said pins will depend upon the nature of the seed or grain to be planted.

A brush 43 is preferably secured to the front wall of the hopper 21 with the bristles thereof bearing against the upper surface of the slide 18 so as to keep the slide clean, and also regulate the amount of seed delivered to the pocket in the seed-slide.

It will here be noted that a bolt 44 serves the dual function of fastening the handles 33 on the side-bars 5 and also as a means for securing the standards 23 in position on said side-bars.

Having thus described the invention what is claimed as new is:—

1. A planter including a frame, a wheel mounted on the frame and provided with a laterally extending pin, a hopper, a seed slide, a swinging frame pivotally mounted above the wheel and having its free end bifurcated to form spaced arms embracing said wheel, one of the arms being operatively connected with the seed slide and the other arm extending in the path of movement of the pin, a spring forming a connection between the pin engaging arm and a fixed portion of the frame, and means for moving the free end of the frame laterally against the tension of the spring out of the path of said pin.

2. A planter including a frame, a wheel journaled on the frame and provided with spaced laterally extending pins, standards mounted on the frame, a hopper, a slide for discharging the seed from the hopper, a swinging frame pivotally mounted between the standards and having its free end bifurcated to form spaced arms, one of which is operatively connected with the seed slide, and the other extended into the path of movement of and actuated by the pins to reciprocate said seed slide, and a spring forming a yieldable connection between the pin engaging arm and frame of the planter for returning the swinging frame to normal position.

3. A corn planter including a supporting frame, a wheel journaled on the frame and provided with spaced laterally extending pins, standards secured to the supporting frame, a hopper, a seed slide, a swinging frame pivotally mounted between the standards and having its lower end bifurcated to form spaced arms embracing the wheel, one of which is disposed in the path of movement of the pins, a rod forming a pivotal connection between the other arm and said seed slide, means engaging the pin carrying arm for yieldably supporting the swinging frame in normal position, and means for moving the swinging frame out of the path of the pins.

4. A corn planter including a supporting frame, a wheel journaled on the frame and provided with the spaced laterally extending pins, a hopper, a seed-slide, spaced standards secured to the supporting frame, a swinging frame pivotally mounted upon the standards and having its lower end bifurcated to form spaced arms of different lengths, a rod forming a connection between the lower end of the long arm and said seed-slide, a spring forming a connection between the short arm and the supporting frame, the lower end of said short arm being disposed in the path of movement of the pins for tilting the swinging frame thereby to actuate the seed-slide.

5. A planter including a supporting frame having operating handles, a wheel journaled on the frame and provided with a laterally extending pin, a hopper, a seed-slide, a swinging frame pivotally mounted on the supporting frame and provided with spaced arms embracing the wheel, one of which is extended into the path of the pin, a spring forming a connection between one arm of the swinging frame and supporting frame, a rod forming a connection between the other arm and said seed-slide, a lever, a finger-piece pivotally mounted on one of the handles, and a second rod forming a connection between the finger-piece and lever for actuating said lever to move the swinging frame out of the path of the pin when the finger-piece is operated.

6. A planter including a supporting frame having handles, a hopper, a seed-slide, spaced standards secured to the supporting frame, a wheel journaled on the frame and provided with a laterally extending pin, a transverse brace connecting the standards and having a recess formed therein, a swinging frame pivotally mounted between the standards and provided with spaced arms, one of which is disposed in the path of the pin, a rod connecting the other arm with the rear end of the seed-slide, a spring forming a connection between the supporting frame and swinging frame, a lever pivotally mounted on one of the standards and having its lower end extending through the recess in the transverse brace and curved laterally, a finger-piece pivotally mounted on one of the handles of the supporting frame, and a rod forming a connection between the finger-piece and upper end of the rod for tilting the latter to move the tilting frame out of the path of the pin.

7. A corn planter including a supporting frame having spaced side-bars, the forward ends of which are rigidly united, a transverse plate connecting the rear ends of the side-bars, a bar interposed between the converging ends of the side-bars and having one end thereof bent upwardly to form a clevis and the other end thereof bent downwardly to form a support for a shovel, bars secured to the side-bars at the rear of the supporting frame and having their free ends bent downwardly to form supports for auxiliary shovels, spaced standards secured to the side-bars, a hopper, a wheel journaled between the side bars of the frame, handles secured to the standards, a fastening device passing through the handles and adjacent standards and engaging the side bars of the frame, and seed dropping mechanism mounted between the standards and actuated by the wheel for discharging the seed from said hopper.

In testimony whereof, I affix my signature in presence of two witnesses.

LEONARD A. LAWHON. [L. S.]

Witnesses:
L. J. SULLIVAN,
WILL V. CARTER.

---

Copies of this patent may be obtained for five cents each, by addressing the "Commissioner of Patents, Washington, D. C."